INVENTORS
RUSSELL H. VARIAN
WILLIAM W. HANSEN
JOHN R. WOODYARD
BY Paul B. Hunter
ATTORNEY INVENTORS
RUSSELL H. VARIAN
WILLIAM W. HANSEN
JOHN R. WOODYARD
BY Paul B. Hunter
ATTORNEY Patented July 21, 1953

2,646,512

UNITED STATES PATENT OFFICE 2,646,512

OSCILLATION GENERATOR

Russell H. Varian, Cupertino, William W. Hansen, Stanford University, and John R. Woodyard, Berkeley, Calif., assignors to The Board of Trustees of the Leland Stanford Junior University, Stanford University, Calif., a corporation of California Original application September 30, 1941, Serial No. 412,918. Divided and this application December 18, 1947, Serial No. 792,402

5 Claims. (Cl. 250—36)

This invention relates to oscillation generators, more particularly to oscillation generators adapted to produce a plurality of high or ultra high frequencies having stable frequency differences between them.

This application is a division of application No. 412,918, filed September 30, 1941, for Object Detecting and Locating Systems, now Patent 2,435,615.

In many instances, it is necessary or desirable to generate a plurality of frequencies having stable frequency differences therebetween. For instance, in the previously mentioned parent case, there is disclosed a multiple channel, continuous wave, radar system wherein phase differences between the several channels are utilized to provide accurate ranging information. In order that this information will have the required accuracy, it became necessary to generate at least two frequencies having a stable frequency difference.

Accordingly, it is an object of this invention to provide means for generating two or more ultra high frequencies having a fixed stable frequency difference or differences.

Another object is to provide a plurality of high frequencies or ultra high frequencies having frequency differences therebetween which may be accurately controlled by stable low frequency oscillation generators.

Other objects and advantages of the invention will be apparent from the following specification and figures, of which:

Figure 1:
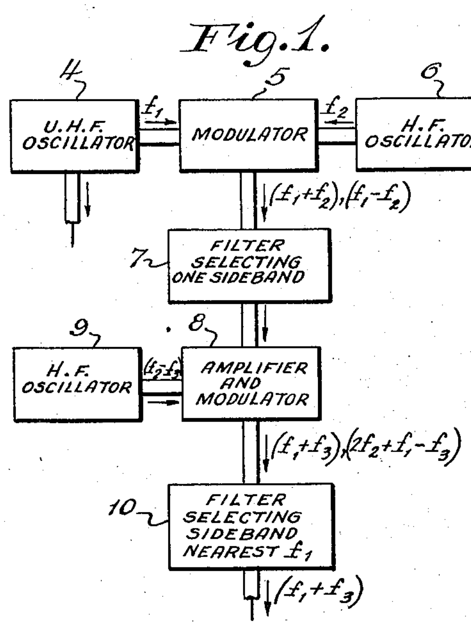
Figs. 1 and 2 are schematic views of apparatus for producing two ultra high frequencies while maintaining a fixed frequency therebetween.
Figure 2:
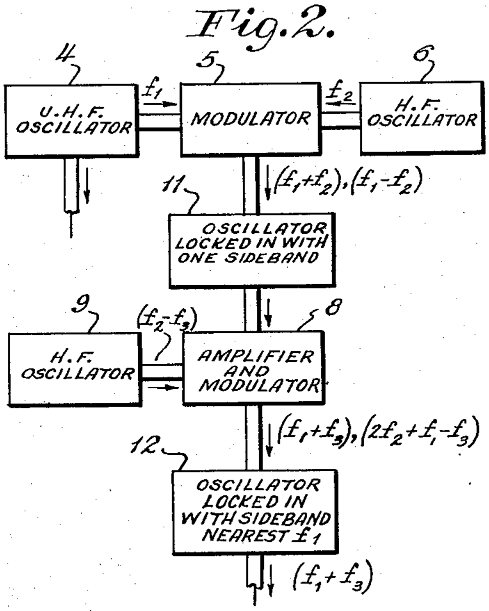

Means for maintaining the desired fixed frequency differences are illustrated in Figs. 1 and 2. In Fig. 1 an ultra high frequency oscillator 4, as of the type disclosed in Patent No. 2,242,275, has its output supplied to a modulator 5 to which is also supplied the output of a high frequency oscillator 6. Thus, if the frequency of the ultra high frequency oscillator is $f_1$ and that of the high frequency oscillator is $f_2$, the output of the modulator or mixer will then be $f_1+f_2$ and $f_1-f_2$. Actually, the frequency of the oscillator 4 may be of the order of $3\times10^9$ cycles per second and the frequency of oscillator 6 may be of the order of $10^6$ cycles. The output of modulator 5 is filtered by filter 7 which selects one side band, for example, $f_1+f_2$ and supplies this side band to an amplifier and modulator 8 to which is also connected the output of a high frequency oscillator 9 whose frequency is designated as $f_2-f_3$ where $f_3$ is of the order of 10,000 cycles, for example, then the output of the modulator 8 will be $f_1+f_3$ and $2f_2+f_1-f_3$. A filter 10 is then used to select the side band which is closest to $f_1$, i. e., $f_1+f_3$ so that the ouput of the apparatus of Fig. 1 is $f_1$ from oscillator 4 and $f_1+f_3$ from filter 10. The frequency difference which is maintained is derived from oscillators 6 and 9 which are of low frequency relative to that of oscillator 4, are in the ordinary radio range, and can be maintained with excellent frequency stability. Therefore, the difference frequency $f_3$ will be very stable so that the two frequency outputs of the apparatus of Fig. 1 are maintained with substantially unvarying frequency difference.

In the form of the apparatus shown in Fig. 2, instead of using the filter 7, an oscillator 11 is employed which is locked into step with the desired side band such, for example, as $f_1+f_2$. In effect, this oscillator takes the place of the filter 7 Fig. 1. Also an oscillator 12 is used in lieu of filter 10, otherwise these structures are similar.

Figure 3:
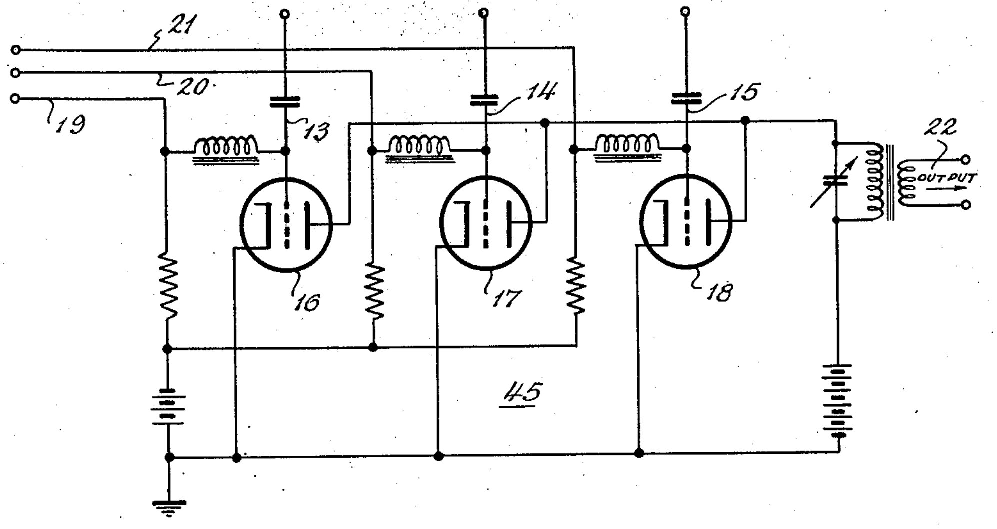
Fig. 3 is a schematic diagram of a circuit for taking the sum or difference of two three-phase frequencies.

Still another way of obtaining two ultra high frequencies having a fixed slight frequency difference therebetween is illustrated in Fig. 3 of the drawings. In this figure, high frequency three phase current is supplied through leads 13 to 15 to the grids of triodes 16 to 18. The grids of these tubes are also supplied with low frequency three phase current over leads 19 to 21. Thus, for example, the frequency supplied over leads 13 to 15 may be of the order of $10^7$ cycles per second, and the frequency supplied over leads 19 to 21 may be 33.3 cycles per second, the latter three phase current being supplied at a higher potential than the ultra high frequency three phase current so as to change the mutual conductance of the tubes 16 to 18 in accordance with the applied low frequency potential. This low frequency potential will therefore cause the tubes to pass current in succesison, whereby the output circuit 22 shifts in phase continuously at the rate of one cycle every $$\frac{1}{33.3}$$

fraction of a second, hence the frequency output of leads 22 will have a value, for instance $10^7$ cycles per second plus 33.3 cycles or $10^7-33.3$, thus obtaining the sum or difference of the two input frequencies depending upon in which manner the phases are connected. This frequency output supplied over leads 22 may now be multiplied by multiplier circuits to an ultra high frequency value such as $3\times10^9$ cycles.

Figure 4:
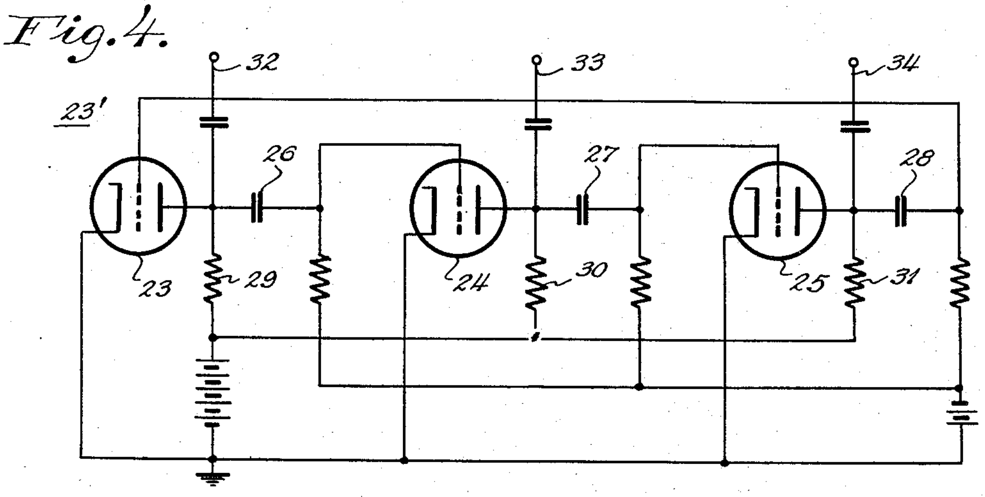
Fig. 4 is a schematic diagram of a low frequency three-phase oscillator.

The low three-phase frequency supplied through leads 19 to 21 may be furnished by an oscillator of the type shown in Fig. 4 of the drawings. This oscillator 23' comprises three tubes 23 to 25, shown as resistance coupled and having condensers 26 to 28 and resistances 29 to 31 so proportioned relatively that a 120° phase shift is obtained between each successive pair of tubes at the desired operating frequency, noting that tube 23 is coupled to tube 24, which in turn is coupled to 25 that is back coupled to 23. Hence, output leads 32 to 34 will supply three phase current.

Figure 5:
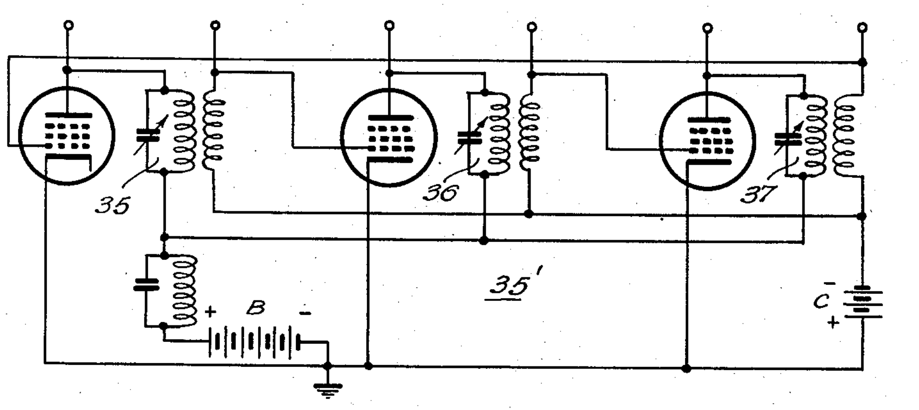
Fig. 5 is a schematic diagram of a high frequency three phase oscillator.

A high frequency oscillator 35' for supplying current to leads 13 to 15 of Fig. 3 is illustrated in Fig. 5. This oscillator is similar to that of Fig. 4 except that resonant circuits 35 to 37 are employed in lieu of resistance coupling, the 120° phase shift between tubes at the desired frequency being obtained by the adjustment of these circuits.

Figure 6:
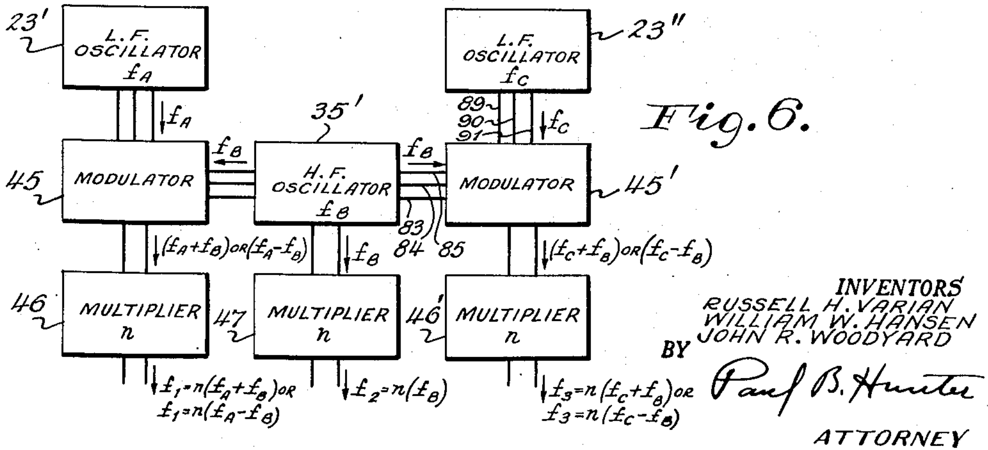
Fig. 6 is a schematic diagram of apparatus for producing a plurality of high frequencies separated by stable frequency differences.

Fig. 6 illustrates a means for obtaining three slightly spaced frequencies. This figure uses the high frequency oscillator 35' of Fig. 5 and the low frequency oscillator 23' of Fig. 4 together with the modulator 45 of Fig. 3. In Fig. 6 two low frequency oscillators 23' and 23'' of different frequencies are used in conjunction with two modulators 45 and 45' to produce two high frequencies, for example, $f_A+f_B$ and $f_C+f_B$ which frequencies are then suitably multiplied by multipliers 46 and 46' to produce two ultra high frequency outputs of slightly different frequency, and the third frequency is supplied by multiplying $f_B$ from oscillator 35' in a multiplier 47. The frequencies are separated by stable frequency differences, which are accurately determined by low frequency oscillators 23' and 23''.

Since many changes could be made in the above construction and many apparently widely different embodiments of this invention could be made without departure from the scope thereof, it is intended that all matter contained in the above description or shown in the accompanying drawings shall be interpreted as illustrative and not in a limiting sense.

What is claimed is:

1. Apparatus for generating two high frequency voltages having fixed stabilized frequency difference therebetween comprising means for generating an ultra high frequency voltage, means for mixing said frequency voltage with a lower stabilized frequency, means for selecting a desired side band of the resulting modulation product comprising an oscillator locked in which said side band, means for mixing said selected side band with another frequency voltage that is slightly different from one of the former frequency voltages, and means connected to said mixing means for selecting a desired side band of the output of said second mixing means.

2. Means for generating a plurality of ultra high frequencies having stable frequency differences therebetween comprising, a first stable low frequency oscillator, an unstable ultra high frequency oscillator, mixing means connected to said oscillators for mixing low frequency and said ultra high frequency, frequency selecting means connected to said mixing means to select the side bands of said ultra high frequency modulated by said low frequencies, a second stable low frequency oscillator, second mixing means connected to said second oscillator and said frequency selecting means, and second frequency selecting means connected to said second mixing means thereby providing a plurality of high frequencies separated by stable low frequency differences.

3. Apparatus, as defined in claim 2, wherein oscillators are employed as said selecting means.

4. Apparatus for generating two ultra high frequencies having a fixed stable frequency difference therebetween comprising means for generating an ultra high frequency, means for modulating said frequency with a stable lower frequency, means for selecting a desired side band of the modulation produced, means for modulating said side band with another stable low frequency that is but slightly different from one of the former frequencies, and means for selecting a desired side band of said second modulation comprising a synchronized oscillator as said side band selecting means.

5. Means for generating a plurality of ultra high frequency voltages having a stable frequency difference therebetween comprising, at least one stable low frequency oscillator, an ultra high frequency oscillator, mixing means connected to said oscillators for mixing said low frequency and said ultra high frequency voltages, frequency selecting means connected to said mixing means to separate one of the side bands of said mixed ultra high frequency and low frequency voltages, another stable oscillator, second mixing means arranged to mix said separated side band and said last oscillator output voltage, and second frequency selecting means connected to said second mixing means to separate one of the side bands of the output of said second mixing means, said latter separated side band output voltage and said ultra high frequency output voltage having a stable frequency difference therebetween.

RUSSELL H. VARIAN.
WILLIAM W. HANSEN.
JOHN R. WOODYARD.

References Cited in the file of this patent

UNITED STATES PATENTS

| Number | Name | Date |
|---|---|---|
| 2,131,558 | Granger | Sept. 27, 1938 |
| 2,231,634 | Monk | Feb. 11, 1941 |
| 2,234,209 | Tollaksen | Mar. 11, 1941 |
| 2,248,442 | Stocker | July 8, 1941 |
| 2,265,083 | Peterson | Dec. 2, 1941 |
| 2,487,857 | Davis | Nov. 15, 1949 |
| 2,494,345 | Manke | Jan. 10, 1950 |
| 2,501,591 | Bach | Mar. 21, 1950 |

FOREIGN PATENTS

| Number | Country | Date |
|---|---|---|
| 486,448 | Great Britain | June 2, 1938 |